Feb. 28, 1967  J. G. CADIOU  3,306,231
PISTON PUMPS
Filed Sept. 10, 1965

Jean G. Cadiou
Inventor

By Wenderoth, Lind & Ponack
Attorneys

United States Patent Office 3,306,231
Patented Feb. 28, 1967

3,306,231
PISTON PUMPS
Jean G. Cadiou, Paris, France, assignor to Societe Anonyme Andre Citroen, Paris, France, a corporation of France
Filed Sept. 10, 1965, Ser. No. 486,462
Claims priority, application France, Sept. 11, 1964, 987,840
1 Claim. (Cl. 103—178)

In piston pumps the suction valve member, whether it is carried by the cylinder body or by the piston, is designed as a rule to have the minimum weight so as to require only a weak spring, or to produce a low spring effect in case it acts itself as a spring, in order to avoid as much as possible filling deficiencies at high operating speeds. This requirement and the use of a spring constitute inconveniences increasing with the desired delivery pressure and when the rate of piston strokes is subjected to considerable variations.

This invention relates to an improved piston pump structure whereby the above-mentioned inconveniences are eliminated.

To this end, the piston pump according to this invention, which comprises a suction valve member carried by the piston is essentially characterized in that said valve member consists of an annular member slidably mounted in the cylinder bore and freely mounted on the piston proper with an axial clearance whereby it can uncover or close the suction passage between this annular member and the piston, so that the inertia of this valve member and its frictional contact with the cylinder wall and even the inertia alone are sufficient to determine the opening and closing of said suction passage as a consequence of the reciprocating movements of said piston.

A typical form of embodiment of a pump according to this invention is described hereinafter by way of example with reference to the attached drawing, in which.

Figure 1:
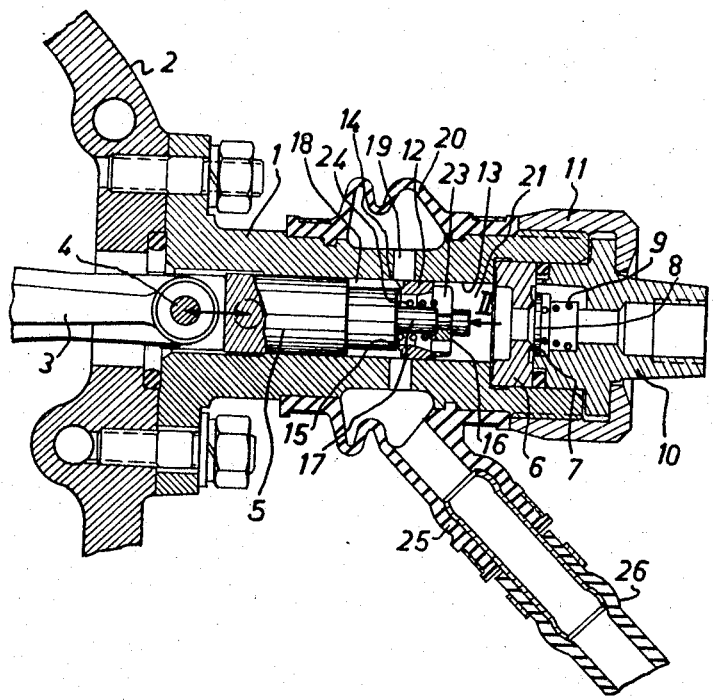
FIGURE 1 is an axial sectional view of a single-piston pump.
Figure 2:
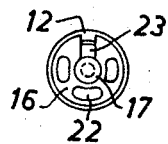
FIGURE 2 is an end view of the piston as seen in the direction of the arrow II of FIGURE 1.

The pump illustrated comprises a cylinder body 1 which in this example is secured to a case 2 in which a driving connecting-rod 3 is adapted to move, this connecting-rod 3 being connected by means of a pin 4 to the pump piston 5.

The bottom of cylinder 6 constitutes a seat 7 of a conventional type delivery valve member 8 normally urged against its seat 7 by a spring 9.

This spring 9 bears with its outer end against a union or like connecting member 10 which, together with the cylinder bottom, is assembled with the cylinder body 1 by means of a flanged nut 11 screwed on said body 1.

The piston 5 is provided with a suction valve member 12 consisting of an annular member mounted on the one hand for sliding motion in the bore 13 of the cylinder body 1 and on the other hand freely on the piston 5 with an axial clearance 14 corresponding to the free motion imparted to this valve member between a shoulder 15 of the piston and an abutment 16 secured on an extension 17 of the piston within said valve member.

It will be noted that the shoulder 15 constitutes in this example the seat of the valve member 12 and that the axial clearance 14 designated in the drawing provides the suction passage adapted to be opened or closed by the valve member 12. On one side of the seat formed by the shoulder 15 the piston 5 provides in the pump cylinder an annular chamber 18 constantly connected through passages 19 formed through the cylinder body to a suction chamber 20.

On the other side of the seat 15 the annular passage provided between the valve member 12 and the extension 17 of piston 5 communicates with the pump chamber 21 through orifices 22 formed in the abutment member 16.

This abutment member, consisting in this example of a relatively thick washer, engages a groove formed in said piston extension 17 by means of a radial slot 23 acting at the same time as a fluid passage, this engagement being sufficient to retain the abutment member in this groove once it is engaged with the piston 5 in the cylinder bore 13.

Furthermore, this abutment member may be held in position by means of a compression coil spring 24 as shown in the drawing.

It is clear that with this specific construction the frictional engagement between the valve member 12 and the wall of the cylinder bore 13, and the inherent inertia of this valve member and even the inertia alone, are sufficient for opening and closing in a reliable and simple manner the suction passage 14 in response to successive piston reciprocations, that is, when the direction of motion of the piston is reversed, whereby the opening and closing of the fluid passage will always take place exactly at the proper time irrespective of the conditions of operation of the pump (rate of piston strokes, and pressure).

Moreover, in order to prevent pulses from being created in the suction circuit, it is known to provide an elastic chamber, this requirement being easily met in this construction by providing a suction chamber 20 in the form of an elastic expansible casing having its ends clamped in fluid-tight engagement on the body 1, this elastic casing being provided with an integral connecting pipe 25 adapted to receive the suction pipe line 26.

Of course, the form of embodiment of the invention which is illustrated and described herein should not be construed as limiting the invention, since many modifications and variations may be brought thereto without departing from the spirit and scope of the invention as set forth in the appended claim.

I claim:

Piston pump comprising a cylinder, a piston in said cylinder, a suction valve member carried by said piston, said valve member comprising an annular member slidably mounted in said cylinder and freely mounted on said piston with an axial clearance so that said valve member may open or close a suction passage provided between said annular valve member and said piston, whereby the inertia of said valve member and its frictional engagement with the cylinder wall and even the inertia alone are sufficient for opening and closing said suction passage in response to the piston reciprocations, an elastic expansible casing mounted on said cylinder constituting a suction chamber and said casing having an integral pipe for connecting said casing to a suction pipe line.

References Cited by the Examiner

UNITED STATES PATENTS

| 2,390,832 | 12/1945 | Ginter | 103—178 |
| 2,968,255 | 1/1961 | Loeber | 103—178 |
| 3,043,235 | 7/1962 | Smith | 103—192 |

ROBERT M. WALKER, *Primary Examiner.*